United States Patent [19]

Robert

[11] Patent Number: 5,394,196
[45] Date of Patent: Feb. 28, 1995

[54] METHOD OF CLASSIFYING THE PIXELS OF AN IMAGE BELONGING TO A SEQUENCE OF MOVING IMAGES AND METHOD OF TEMPORAL INTERPOLATION OF IMAGES USING THE SAID CLASSIFICATION

[75] Inventor: Philippe Robert, Rennes, France
[73] Assignee: Thomson-CSF, Puteaux, France
[21] Appl. No.: 946,371
[22] PCT Filed: Mar. 27, 1992
[86] PCT No.: PCT/FR92/00278
   § 371 Date: Nov. 19, 1992
   § 102(e) Date: Nov. 19, 1992
[87] PCT Pub. No.: WO92/17983
   PCT Pub. Date: Oct. 15, 1992

[30] Foreign Application Priority Data
   Apr. 5, 1991 [FR] France .............. 91 04164

[51] Int. Cl.$^6$ .............................. H04N 7/137
[52] U.S. Cl. ........................ 348/699; 348/416
[58] Field of Search ......... 348/416, 699, 413, 407; H04N 7/137

[56] References Cited

U.S. PATENT DOCUMENTS 5,214,751 5/1993 Robert .................. 345/136

OTHER PUBLICATIONS

IEEE Transactions on Communications, vol. 37, No. 12 Dec. 1989, (New York, US), S. C. Brofferio: "An Object-background image model for predictive video coding", pp. 1391-1394.
BBC Research Department Report, No. 11, Sep. 1987, (Tadworth, GB), G. A. Thomas: "Television motion measurement for DATV and other applications", pp. 1-20.
Signal Processing, vol. 15, No. 3, Oct. 1988, (Amsterdam, NL), M. Hotter, et al.: "Image segmentation based on object oriented mapping parameter estimation", pp. 315-334.
Frequenz, vol. 43, No. 5, May 1989, (Berlin, DE), M. Gilge et al.: "Codierung von farbigen Bewegtbildszenen mit 64 kbit/s–Ein neuer Ansatz zur Verwirklichung eines Bildtelefons im ISDN (Teil III)", pp. 126-133.

*Primary Examiner*—Howard W. Britton
*Attorney, Agent, or Firm*—Oblon, Spivak, McClelland, Maier, & Neustadt

[57] ABSTRACT

The present invention relates to a method of classifying the pixels of an image belonging to a sequence of moving images, as well as to a method of temporal interpolation of images using this classification. The method of classifying the pixels of an image t(j+1) pertains to temporal projection of the field of motion of an image t(j) belonging to a sequence of moving images, with the pixels of the image t(j) being defined by a motion vector and by a tag belonging to a class such as "normal", "occluding" or "appearing". The method is characterized by the fact that, before projection, all pixels of t(j) are tagged "appearing", and then, during the temporal projection, the tagging is modified as a function of the tagging of the pixels of t(j) in such a way as to obtain a tagging according to the same above classes (i.e., normal, occluding, or appearing).

15 Claims, 5 Drawing Sheets

METHOD OF CLASSIFYING THE PIXELS OF AN IMAGE BELONGING TO A SEQUENCE OF MOVING IMAGES AND METHOD OF TEMPORAL INTERPOLATION OF IMAGES USING THE SAID CLASSIFICATION

BACKGROUND OF THE INVENTION

1. Field of the Invention

The present invention relates to the processing of images, in particular to the processing of video images such as television type images.

2. Discussion of Background

In general, in the case of video images, in particular in the case of television images, most commonly sequences of images are displayed representing scenes in motion. Therefore, the pixel should no longer be regarded as a simple image element, but rather as an object element, this object element being able to evolve within the image over time, that is to say appear, move, change luminance and/or disappear. It is therefore essential to be able to take this motion into account at pixel level, this motion being a very frequent cause of change over time. Taking the motion into account therefore makes it possible efficiently to process most of the possible situations within a scene.

To carry out a scene analysis as correctly as possibly, it is therefore important to be able to classify the pixels by assigning them a tag giving information about the evolution of the motion of the pixel. The tags giving a correct scene analysis are the tags chosen from those belonging to one of the classes termed "normal", "occluding", "appearing" or "disappearing". Indeed, the "normal" tag signifies that the image element is present in the two successive images considered, the "appearing" tag signifies that the image element is present in the current image but absent from the preceding image. The "disappearing" tag signifies that the image element is absent from the current image but present in the preceding image, whereas the "occluding" tag signifies that the current image contains foreground objects which occlude background zones of a preceding image. These four classes correspond perfectly to the various events which may occur at pixel level.

The assigning of a tag to each pixel of an image therefore shows itself as an indispensable complement to the estimation of motion and to the interpolation of images used in the context of video image processing, in particular to the temporal interpolation of images, as described in French Patent Application No. 87 07814 in the name of THOMSON GRAND PUBLIC or to the temporal interpolation of images with compensation for corrected motion, as described in French Patent Application No. 89 04256 filed in the name of Thomson Consumer Electronics.

Indeed, although interpolation with compensation for motion makes it possible accurately to reconstruct the pixels in motion, problems remain at the level of the pixels appearing or disappearing from one image to the next. In general, the estimator is perturbed by the presence of such pixels which have no counterpart in the other image. Moreover, the interpolation of the pixels should only be performed on the basis of the input image which contains them, thus constituting a particular procedure which can only be applied if the pixels have been identified.

SUMMARY OF THE INVENTION

Accordingly, the aim of the present invention is to rectify these disadvantages by providing, firstly, a method of classifying the pixels of a current image which make it possible to detect the pixels or image elements appearing and disappearing from one image to the next in the case where the current image is obtained by temporal projection of the field of motion of the preceding image belonging to a sequence of moving images.

Thus, the subject of the present invention is a method for classifying the pixels of a current image $t(j+1)$ obtained by temporal projection of the field of motion of a preceding image $t(j)$ belonging to a sequence of moving images, the pixels of the preceding image possessing a motion vector and a tag, the tag belonging to a class defined from at least three classes termed "normal", "occluding" or "appearing", the said method being characterised in that:

before projection, all the pixels of the current image $t(j+1)$ are tagged "appearing";

then, during temporal projection carried out in a known manner, the tagging is modified by taking into account the tagging of the pixels of the image $t(j)$ in such a way that:

if a pixel tagged "appearing" receives a motion vector, its tag becomes "normal";

if a pixel tagged "normal" receives a motion vector, its tag becomes "occluding" and it is assigned the motion vector with minimum $|DFD|$ (for displaced frame difference);

if a pixel tagged "occluding" receives a motion vector, its tag remains "occluding" and it is assigned the motion vector with minimum $|DFD|$ and;

if a pixel tagged "appearing" receives no motion vector, it remains tagged "appearing".

In this case, the field of motion of the current image $t(j+1)$ is obtained by temporal projection of the field of motion of a preceding image $t(j)$ as described in French Patent Application No. 88 12468 in the name of THOMSON-CSF.

By taking into account the field of tags of the preceding image $t(j)$, a temporal motion prediction field and a tag prediction field are therefore obtained for the current image $t(j+1)$.

The aim of the present invention is also to provide a novel image interpolation method exploiting the above classification given to the pixels. The interpolation method is based on an interpolation technique with compensation for the inter-image motion which consists in interpolating the pixels in the direction of their motion on the basis of the two frames or input images enclosing them.

Such methods of interpolation with motion compensation are described for example in French Patent Applications No. 87 07814 and No. 89 04256.

Accordingly, the subject of the present invention is a method of temporal interpolation of images with motion compensation, including in particular a phase of estimating the field of: "motion of the field of tags of an image to be interpolated $T(j)$ from at least two known images $t(j)$, $t(j+1)$ enclosing it, the characteristics of each pixel of the image $t(j)$ being determined from the characteristics of the associated pixels of the images $t(j)$, $t(j+1)$ each defined by a motion vector and by a tag, in which the field of motion of the image to be interpolated $T(j)$ is defined by temporal projection of the estimated field of motion at the known image t(j+1) obtained using the method of classification described above, characterised in that before projection, all the pixels of the image to be interpolated T(j) are tagged "holes";

then, in the course of the temporal projection, the tags and the motion vectors assigned to the pixels of the image t(j+1) are examined and a tag and a motion vector are given to the pixel of the image to be interpolated T(j) according to the table below:

| T(j) tag + vector | t(j + 1) tag + vector | Normal or appearing or Occluding and \|DFD\| > S (S = threshold) D1 | Occluding [lacuna] D1 |
|---|---|---|---|
| Hole | Normal D1 | | Occluding D1 |
| Normal D2 | Normal | min(\|DFD(D1)\|, \|DFD(D2)\| | Occluding D1 |
| Occluding D2 | Occluding D2 | | Occluding min(\|DFD(D1)\|, \|DFD(D2)\|) |

The above method makes it possible to define the field of motion and the field of tags of the image to be interpolated T(j) by using the field of motion estimated at the known image t(j+1). Once these elements are known, various methods can be used to interpolate the luminance of the pixels.

The subject of the present invention is also a method of temporal interpolation based on the method described above but characterised in that:

when projecting the field of motion of the known image t(j+1) onto the image to be interpolated T(j), the motion vector of the pixels of the image t(j+1) tagged "appearing" is not projected;

next, the field of motion of the image t(j) is projected onto the image to be interpolated T(j) by using the same method as for the projection of the image t(j+1), but by tagging "disappearing" a "hole" pixel filled by a motion vector;

then, the field of motion of an image t(j+2) following an image t(j+1) is projected onto the image to be interpolated T(j) by using the same method as for the projection of the image t(j+1) but by tagging "appearing" a "hole" pixel filled by a motion vector in such a way as to take into account the "appearing" and "disappearing" pixels.

BRIEF DESCRIPTION OF THE DRAWINGS

Other characteristics and advantages of the present invention will emerge on reading the description of various embodiments given below with reference to the attached drawings in which.

DETAILED DESCRIPTION OF THE PREFERRED EMBODIMENTS

The present invention therefore relates to a method of classifying the pixels of the current image making it possible accurately to reconstruct the zones in motion in the image and in particular to determine the zones "appearing" or "disappearing" from one image to the next. The present invention also relates to a method of interpolation with compensation for motion together with inclusion of this classification of the pixels. However, the classification of the pixels is carried out on the pixels of a current image obtained by temporal projection of the field of motion of a preceding image belonging to a sequence of moving images. In this case, the temporal projection of the motion is carried out according to the method described in French Patent Application No. 88 12468 and in French Patent Application No. 87 07814. Accordingly, we shall not redescribe the subject of these two patents in full. However, the parts which relate to temporal projection will be briefly described whilst referring to FIG. 1. The present invention will be described whilst referring to images with progressive format. However, it is clear to the expert to apply the method to an interlaced format by taking into account line shifts as is explained in French Patent Application No. 87 07814. Moreover, the terms "frame" or "image" will be employed interchangeably hereafter.

Figure 1:
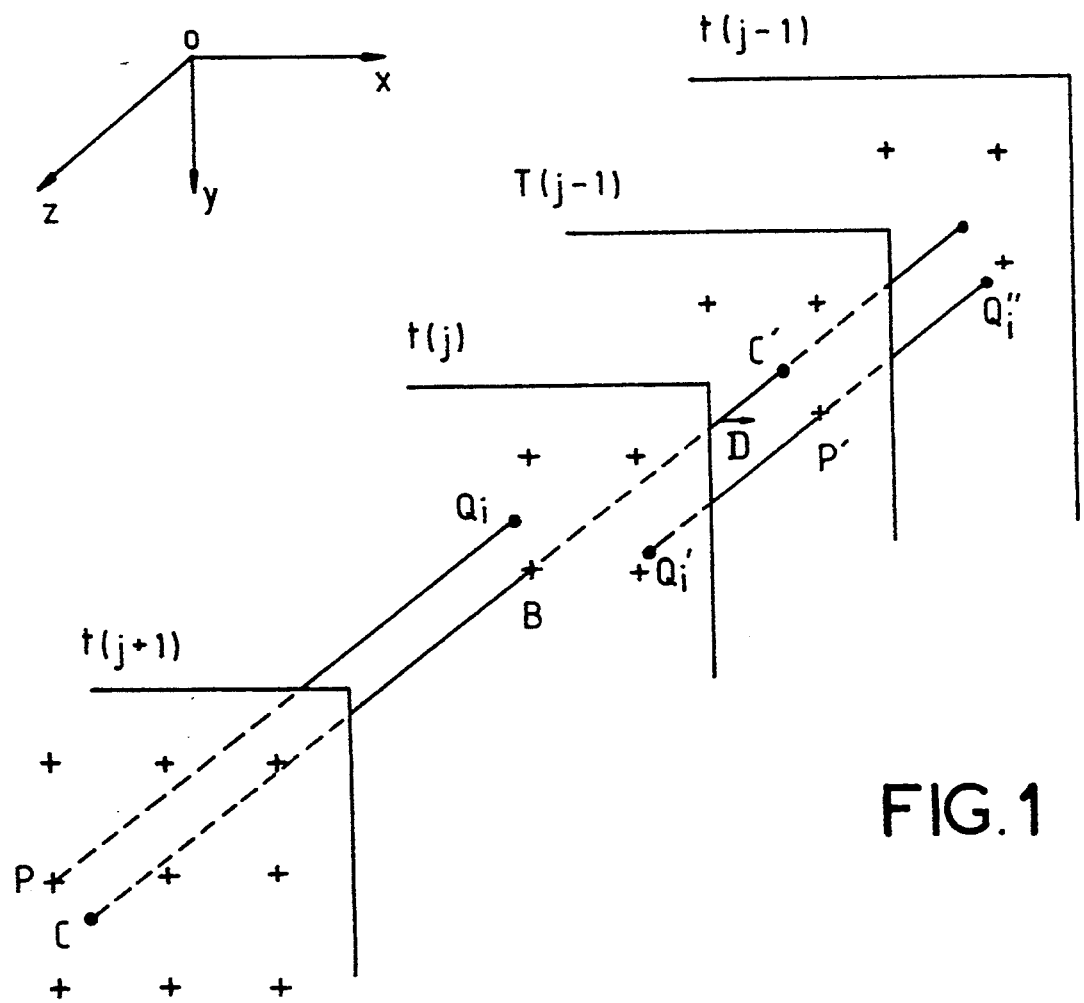
FIG. 1 is an exploded view of several successive frames with a dummy frame interpolated between two successive frames in order to illustrate the method of temporal prediction employed in the present invention.

In FIG. 1 has been represented, in an orthonormal reference frame OXYZ in which the Z axis corresponds to time, various frames t(j−1), t(j), t(j+1) belonging to a sequence of moving images as well as a dummy frame T(j−1) corresponding to a frame interpolated between the two images t(j−1), t(j). In this case, we start from the field of motion calculated for the pixels of the frame t(j). This field of motion consists of a set of motion vectors assigned to each pixel respectively of the image t(j). Let D=(DX, DY), the motion vector of a pixel B of the frame or image t(j), if it is assumed that the motion is linear, the motion vector of the pixel B with spatial coordinates (x, y) can be attributed to the point C of the frame or image t(j+1) with spatial coordinates x1, y1 which is the point of image on this impact of the motion vector attributed to B: (x1, y1)=(x+DX, y+DY).

However, the point C does not in general correspond to a pixel. In accordance with the method described in French Patent Application No. 87 07814, the motion vector D is attributed to the pixel P closest to the point C. Thereby we obtain:

D((P, t(j+1))=D((B, t(j)), and

P=(xp, yp) the pixel closest to C.

Similarly, the motion vector of the pixel B with spatial coordinates (x,y) can also be attributed to the point C' of the dummy frame T(j−1), with spatial coordinates (x1', y1'), this point C' being the point of impact on this image of the motion vector attributed to B:

(x1', y1')=(x−a.DX, Y−a DY)

a<1 is a factor taking into account the relative distance from the frame t(j) to the frame T(j−1).

Therefore, as the point C′ does not generally correspond to a pixel, we attribute the motion vector D to the pixel P′ closest to the point C′:

D (P′, T(j−1))=D (B, t(j)), and

P′=(xP′, yP′) the pixel closest to C′.

In the course of this projection several motion vectors may be suggested for the same pixel. This is the case in image analysis when two objects cross. There is then a conflict as explained in French Patent Application No. 88 12468. In this Patent Application, various solutions have been proposed in order to resolve the conflict. One of the solutions adopted consists in comparing the absolute values of the |DFD| (Displaced frame difference or displaced inter-image difference). This solution will be used in the present invention.

In the case of the temporal projection of the current image t(j+1), it is the difference in luminance between the pixel P with spatial coordinates (xP, yP) in the image t(j+1) and the point Qi with spatial coordinates (xP−Dxi, yP−Dyi), the end, in the image t(j) of the vector Di, which gives the |DFD|.

With temporal projection onto the dummy frame T(j−1), it is the difference in luminance between the points Q′i and Q″i, the ends, in the images or frames t(j) and t(j−1), of the vector Di passing through P′ which gives this |DFD| termed |DFDi|.

In the event of a conflict, the vector selected is the one which provides the minimum value of |DFDi|. If several vectors have equal |DFDi| values, in general an arbitrary choice is made in order to assign a motion vector to the pixel. Moreover, having finished projecting the set of motion vectors, it is possible that some pixels may have no associated motion vectors and we then have the case in which the field of motion has "holes".

If this projected field of motion is used as temporal predictor, in particular in a method of estimating image motion, these "holes" can be either preserved as they are, or filled by spatial interpolation of the motion vectors, for example according to the method described in French Patent Application No. 88 12468.

These "holes" may have various origins. Thus, when a zoom is carried out, the objects magnify and details appear. In this case, the holes can be filled by spatial interpolation. Moreover, in successive images, previously hidden zones may appear in a new image. In this case, a straightforward method of spatial interpolation may lead, in certain cases, to visible defects in the image, since the motion vectors assigned to the pixels of this zone are not reliable.

Figure 2:
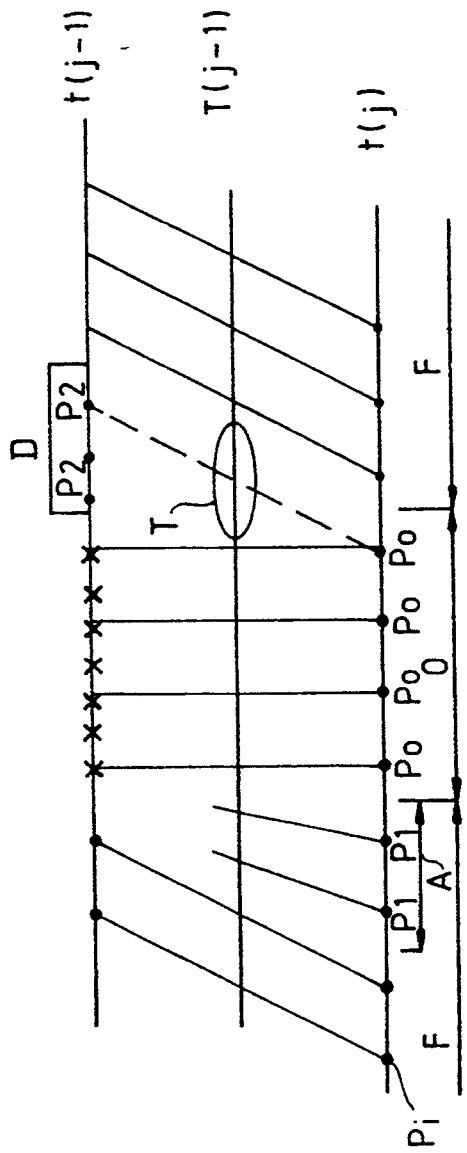
FIGS. 2 and 3 are schematic representations illustrating various types of movement between successive frames.
Figure 3:
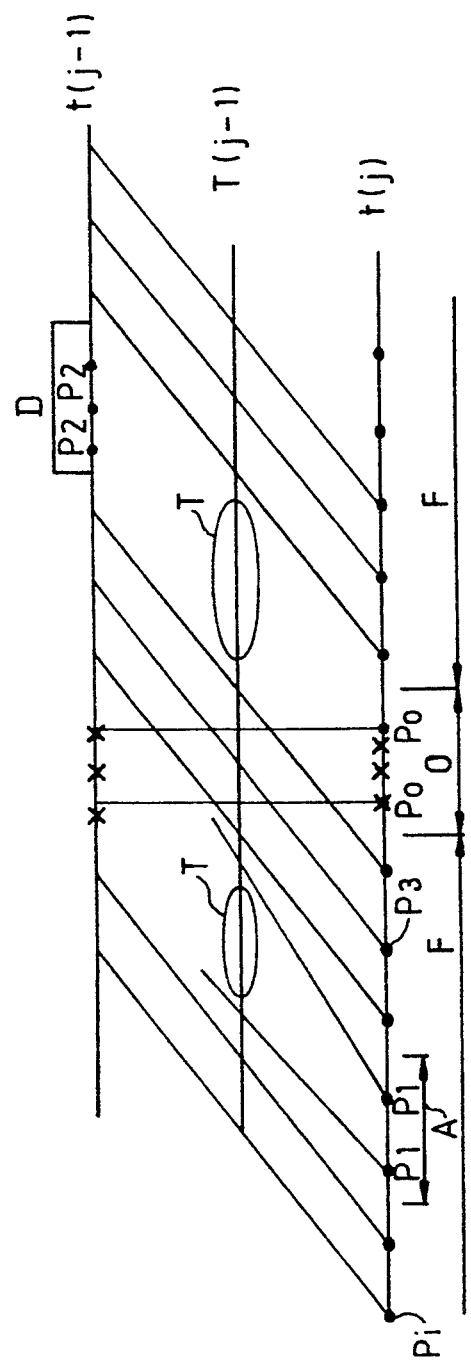

By applying the method of temporal projection described above to the set of pixels of the frame t(j) a field of motion such as represented diagrammatically in FIGS. 2 and 3 can be obtained. These figures are simplified two-dimensional views of the image sequences represented in FIG. 1 in the XZ plane. As represented in FIGS. 2 and 3, a motion vector links each pixel Pi of the current image t(j) to a point of the preceding image t(j−1) as if there exists at each point of the frame t(j) a corresponding point in the frame t(j−1). In this case a field of motion has been defined for all the pixels of the frame t(j). Indeed, the ideal case of temporal projection is a bijection from the pixels of frame t(j−1) to those of frame t(j), each pixel of frame t(j) possessing, in this case, one and only one counterpart in the frame of t(j−1). In the case of the analysis of a sequence of moving images of television type, this is rarely the case. Indeed, objects are often observed in motion with respect to a background. This is the case represented in FIGS. 2 and 3. It is then generally necessary to determine where the object with respect to the background. In the images t(j) of FIGS. 2 and 3, pixels Po receive two motion vectors. Hence there is a conflict and it is necessary to determine which motion vector is to be retained, and this is in general carried out by calculating the minimum |DFD| as mentioned in the prior French Patent Applications. These pixels Po correspond in fact to a foreground object which passes over to background F. These pixels Po therefore correspond to an "occluding" zone referenced O. Moreover, the moving background F is found in both images t(j) and t(j−1) through a straightforward translation as represented clearly in FIGS. 2 and 3. However, for the pixels located at the boundaries of the object, namely pixels P1 in image t(j) or pixels P2 in image t(j−1), some are recovered in image t(j) and the others are discovered between t(j−1) and t(j). They therefore correspond to an "appearing" zone referenced A or to a "disappearing" zone referenced D. Moreover, if the image T(j−1) to be interpolated is examined and if the interpolation of the pixels of this image is performed from the two enclosing input frames t(j) and t(j−1), defects of the echo type are observed in the interpolated image at the edge of the objects. These zones are, in general, called "holes" and referenced T in FIGS. 2 and 3. Moreover, as represented in FIG. 3, some motion vectors, like those of pixels P3, cross pixels Po assigned a motion vector. This results in difficulties in determining which motion vector is suitable for the pixels, that is to say which object is a foreground object. The same is true for the pixels of the "appearing" or "disappearing" zones which are pixels to which it is difficult to assign a correct motion vector.

Now, as mentioned above, when using a temporal projection either from a current image t(j) to a current image t(j+1), or from a current image t(j) to an image to be interpolated t(j−1), these projections carry information about the so-called "occluding", "appearing", or "disappearing" zones of one image to the next. Accordingly, the present invention uses this information in particular to carry out the image interpolation.

The operation of the method of the present invention will now be described in detail whilst referring to FIGS. 4 and 5.

In the present invention, a classification is therefore carried out of the pixels of each new input image t(j+1), based on the classification of the pixels of the input image t(j). Indeed, for input image t(j), each pixel includes a motion vector and a tag such as to define the estimated field of motion and the field of tags of the set of pixels t(j) including those pixels tagged "appearing". The classifying of the pixels of t(j) is performed during the temporal projection onto the frame t(j+1) of the field of motion estimated in t(j), by using the procedure described above, namely the temporal projection procedure described in particular in French Patent Application No. 88 12468.

According to a first stage of the method, a prediction field for the tags of the frame t(j+1) is built up during the temporal projection. Before projection this field is empty and initialised "appearing". In accordance with the present invention, during the temporal projection, the motion vectors of the image t(j) are projected one after the other onto t(j+1). If a pixel Pi initially tagged as "appearing" receives a single motion vector from frame t(j) its tag becomes "normal". If a pixel such as the pixels Po receive two motion vectors projected from frame t(j) there is a conflict. In this case it is assumed that two opaque objects have motions which bring them to the current point. In order to identify the motion vector and the tag which will be kept, the values of |DFD| are compared and the motion vector with minimum |DFD| is retained and this pixel is tagged "occluding" if such is not already the case. Moreover, once all the vectors of t(j) have been projected, the pixels which have received no vector are identified and are tagged "appearing" after temporal projection, as represented by the pixels P1 in FIG. 5.

The procedure described above can be summarized thus:

a pixel tagged "appearing" receives a vector; its tag becomes "normal";

a pixel tagged "normal" receives a vector; its tag becomes "occluding";

a pixel tagged "occluding" receives a vector; its tag is preserved "occluding".

We therefore obtain a predictive field of motion and a field of tags over t(j+1) which does not take into account the field of tags of t(j).

However, at the time of the temporal projection of frame t(j) onto frame t(j+1) it is important to take into account the tags of the pixels of the frame t(j). Indeed, the pixels belonging to new zones in frame t(j), namely the pixels tagged "appearing" in FIG. 5, have little chance of possessing an exact motion vector. Two solutions may be envisaged.

According to the first solution, no motion vector is defined for the pixels tagged "appearing", or else the motion vector is defined but is not projected. In both cases it is necessary to be able to identify these pixels in frame t(j). Accordingly, in the course of projection the field of tags of the frame t(j) will be examined and those pixels with an "appearing" tag will be discarded.

According to a second solution, a motion vector is defined for all the pixels of t(j) and is projected onto frame t(j+1). However, since the motion vector defined for the pixels tagged "appearing" in frame t(j) is not reliable, this motion vector is regarded as not being able to give rise to a pixel tagged "occluding". Accordingly, if in the course of the temporal projection of frame t(j) onto frame t(j+1) there is a conflict between such a motion vector and another motion vector tagged "normal" or "occluding", the motion vector tagged "normal" or "occluding" will be retained with its tag. In this case it is deemed that there is no occlusion phenomenon and that the conflict is accidental. The purpose of projecting all the motion vectors of frame t(j) including those tagged "appearing" is to fill in the zones which have appeared in frame t(j) and are present in frame t(j+1).

Such a motion vector is distinguishable from the other motion vectors of frame t(j) since it is tagged "appearing". On the other hand, in order to distinguish it from the other motion vectors in frame t(j+1), it is tagged differently, i.e. for example "filled in" as represented in FIG. 5. Thus, the temporal projection and comparison of the motion vectors of the frame t(j) with respect to the frame of t(j+1) is performed for the various following cases as illustrated in FIG. 5:

if the pixel of t(j+1) is tagged "appearing", and if the pixel of t(j) is tagged "normal" or "occluding", then the motion vector of this pixel is associated with the pixel of frame t(j+1) whose tagging becomes "normal", however, if the tag of the pixel of t(j) is "appearing", the motion vector of t(j) is associated with the pixel of t(j+1) whose tag becomes "filled in";

if the tag of the pixel of t(j+1) is "normal"; and if the tag of the pixel of t(j) is "normal" or "occluding", then there is a conflict and the motion vectors are compared as discussed above, the motion vector retained is then "occluding" and the tag of the pixel of t(j+1) becomes "occluding";

if the tag of the pixel of t(j+1) is "appearing", then the motion vector associated with it is discarded since it is less relevant than that which is already associated with the pixel of t(j+1) and the tag of t(j+1) is "normal";

if the tag of the pixel of t(j+1) is "filled in"; and if the tag of the pixel of t(j) is "normal" or "occluding", then the motion vector of this pixel replaces the old one since it is more relevant and the tag of the pixel of t(j+1) becomes "normal";

if the tag of the pixel of t(j) is "appearing", then the two motion vectors are compared and the one with minimum |DFD| is selected, and the tag of t(j+1) remains "filled in";

if the tag of the pixel of t(j+1) is "occluding"; and if the tag of the pixel of t(j) is "normal" or "occluding", then the two motion vectors are compared, the one with minimum |DFD| is selected and the tag of t(j+1) remains "occluding";

if, on the other hand, the tag of t(j) is "appearing", then the motion vector arising from frame t(j) is not taken into account and the situation remains the same, and the tag of t(j+1) remains "occluding".

Figure 4:
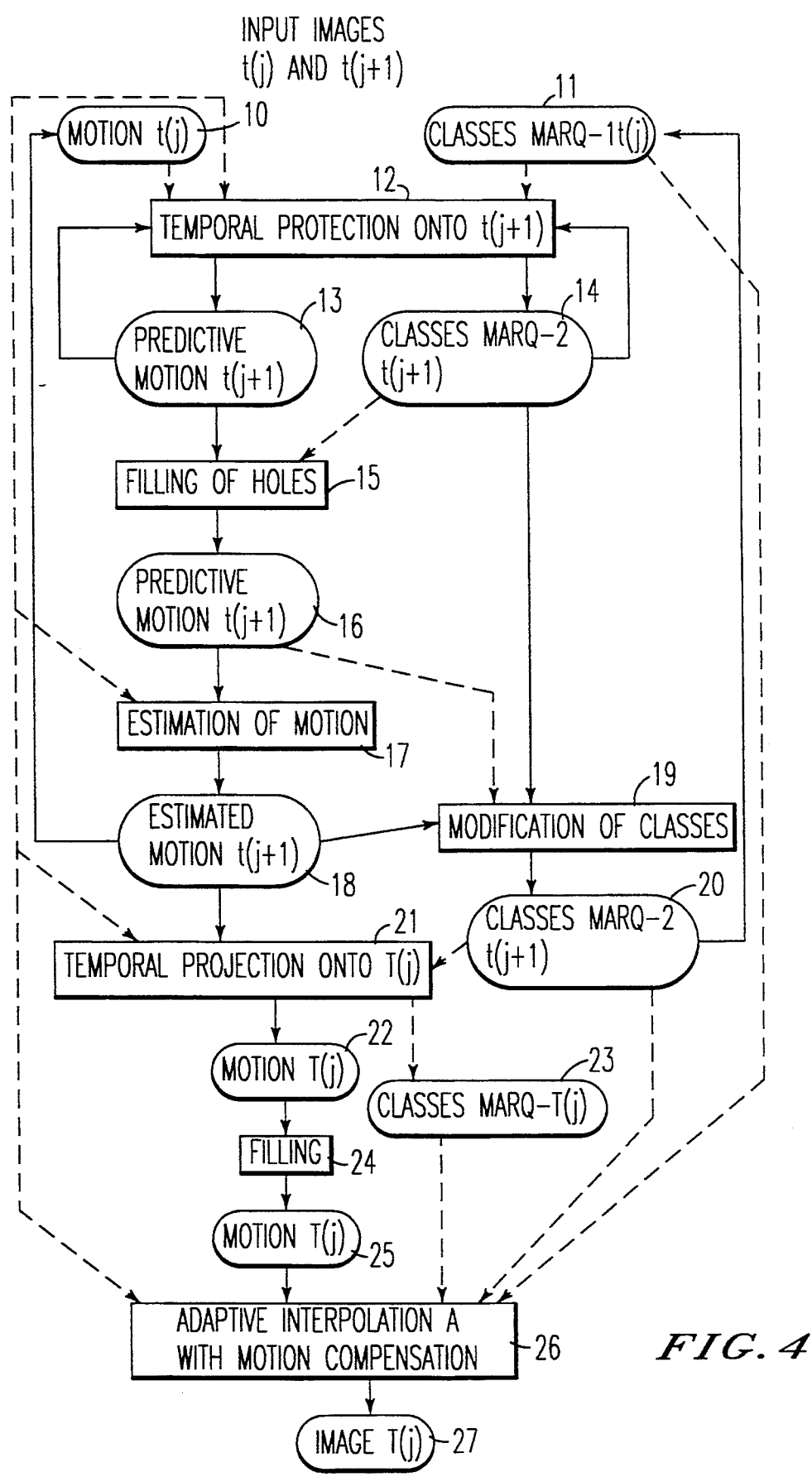
FIG. 4 is a flow diagram giving the various steps of the method making it possible to carry out an adaptive interpolation with motion compensation together with detection and inclusion of the tagging of the pixels in accordance with the present invention.
Figure 5:
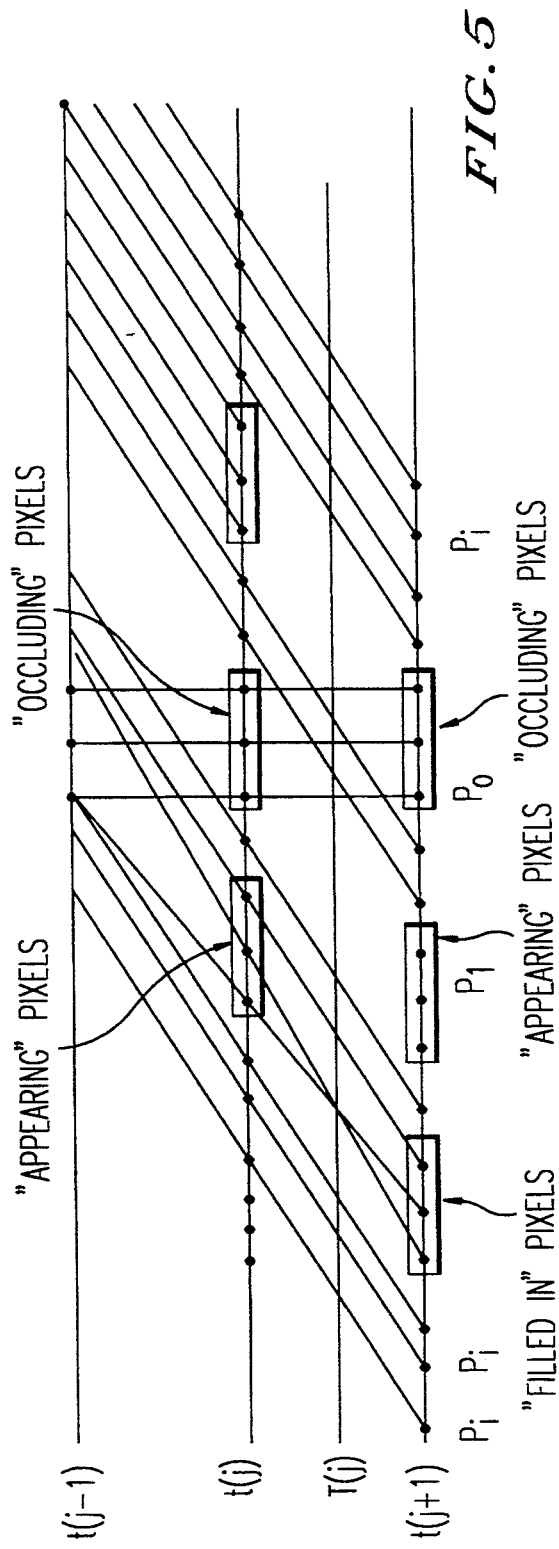
FIG. 5 is a diagram explaining the tagging of the pixels of the current image t(j+1) obtained by temporal projection of the field of motion of t(j)

Hence in this way, a tag prediction field for frame t(j+1), and indicated "marq-2" in FIG. 4, is obtained at the same time as a temporal motion prediction field. Various steps are summarized in Table 1 below.

| t(j + 1) tag + vector | t(j) tag + vector | Appearing D1 | Normal or Occluding D1 |
|---|---|---|---|
| Appearing | | Filled in D1 | Normal D1 |
| Normal D2 | | Normal D2 | Occluding min(|DFD(D1)|, |DFD(D2)|) |
| Occluding D2 | | Occluding D2 | Occluding min(|DFD(D1)|, |DFD(D2)|) |
| Filled in D2 | | Filled in min(|DFD(D1)| |DFD(D2)|) | Normal D1 | of conflict is taken into account right from the first image, even if the field of motion is noise-affected. The noise in the tag field is proportional to the noise present in the field of motion. When employed with, for example, the recursive estimator with temporal prediction described in Patent Application No. 88 12468, the tag field becomes less and less noise-affected as the field of motion becomes more accurate and smoother under the effect of the temporal prediction.

Having obtained the predictive field of motion and the tag field of the frame t(j+1) by employing the method described above, it is necessary to fill the "holes" remaining in the prediction field of motion, that is to say to define a motion vector for the pixels tagged "appearing", and then to estimate the motion at every point of the frame t(j+1) and finally to define the tag field for frame t(j+1).

Various solutions can be envisaged. In order to fill the "holes", for the purpose of estimating the motion at the level of all the pixels of frame t(j+1), the "holes" can be preserved as they are. In this case, the corresponding pixels will not have available any motion vector, i.e. any temporal predictor. Moreover, the holes can also be filled in by spatial interpolation of the motion vectors assigned to the pixels enclosing the relevant point by using, for example, the method described in French Patent Application No. 88 12468.

Having completed this operation a temporal motion prediction field is available for image t(j+1). The next operation therefore consists in estimating the motion for the pixels of image t(j+1). It is possible for example to use the recursive estimator with temporal prediction described in French Patent Application No. 88 12468. The estimator thus provides an estimated field of motion for image t(j+1).

Having carried out the estimation of motion, a new tag field is defined for image t(j+1), in accordance with the present method, by taking into account the estimated field of motion and the tag field which are obtained in the course of the temporal projection. Various tags appearing at this moment for the pixels of t(j+1) are the "normal", "occluding", "filled in", and "appearing" tags. This classification of the pixels is based on the motion prediction field. Since the estimated field of motion is in principle more accurate than the temporal prediction field, in order to obtain more accurate tags, the two fields of motion are compared for each pixel and the tagging of the pixel is modified if the vectors are very different. In fact, the modification relates mainly to the pixels tagged "occluding". Indeed, if the motion vector of a given pixel is modified significantly during motion estimation, this motion vector is regarded as having in fact been inaccurate and the "occluding" tagging as having been unreliable. To obtain the correct information the difference in absolute value is observed between the motion vector obtained during the temporal prediction and the estimated motion vector for each of the horizontal and vertical components:

i.e. the predicted vector $Dp=(dxp, dyp)$ and the estimated vector $De=(dxe, dye)$. We then calculate: $diff-x=|dxe-dxp|$ and $dif-y=|dye-dyp|$. If one of the two differences $diff-x$ and $diff-y$ is greater than a threshold S, the associated "occluding" tag becomes "normal".

If the estimator described in Patent No. 89 0673 is employed, this operation of modifying the classification is performed after middle filtering of the field of motion and before projection onto the image to be interpolated T(j).

On the other hand, the "filled in" tagging which was of use in distinguishing between the projected motion vectors arising from the filling and the others, is no longer of use during motion estimation or during temporal projection onto the image to be interpolated T(j). Accordingly, the "filled in" tag will be replaced by the "normal" tag. Thereby, we obtain, for the tag field of t(j+1), the new classification:

if the tag of t(j+1) is "normal", it remains "normal";

if the tag of t(j+1) is "appearing", it remains "appearing";

if the tag of t(j+1) is "occluding" and if $diff-x<S$ and $diff-y<S$, the tag remains "occluding", otherwise the tag becomes "normal"; and if the tag of t(j+1) is "filled in", it becomes "normal".

Having carried out this operation an estimated field of motion is therefore available for image t(j+1), as is a new tag field for the pixels of t(j+1) of the same type as those of the input image t(j); i.e. a tag field with three classes. These two fields can therefore be used for temporal projection onto the image to be interpolated T(j). They can also be used in the temporal projection to a succeeding input image t(j+2) according to the method described above for the temporal projection of image t(j) onto the image t(j+1).

Other modifications may be envisaged during the various phases described above. Thus, it is possible to affirm the "occluding" tag only when the pixel which is being followed along the sequence of moving images has been labelled "occluding" at least n times with n strictly greater than 1. This requires that the age of the "occluding" tag be stored in memory.

According to another modification, at the time of the temporal projection of the field of motion of image t(j) onto image t(j+1), it is possible to detect the zones "disappearing" from t(j) to t(j+1). A pixel of image t(j) whose motion vector projected onto image t(j+1) is in conflict with another pixel and is not retained, is then tagged "disappearing". In this case, a new class is introduced and four types of tags are obtained in image t(j), namely "normal", "occluding", and "appearing", "disappearing".

Figure 6:
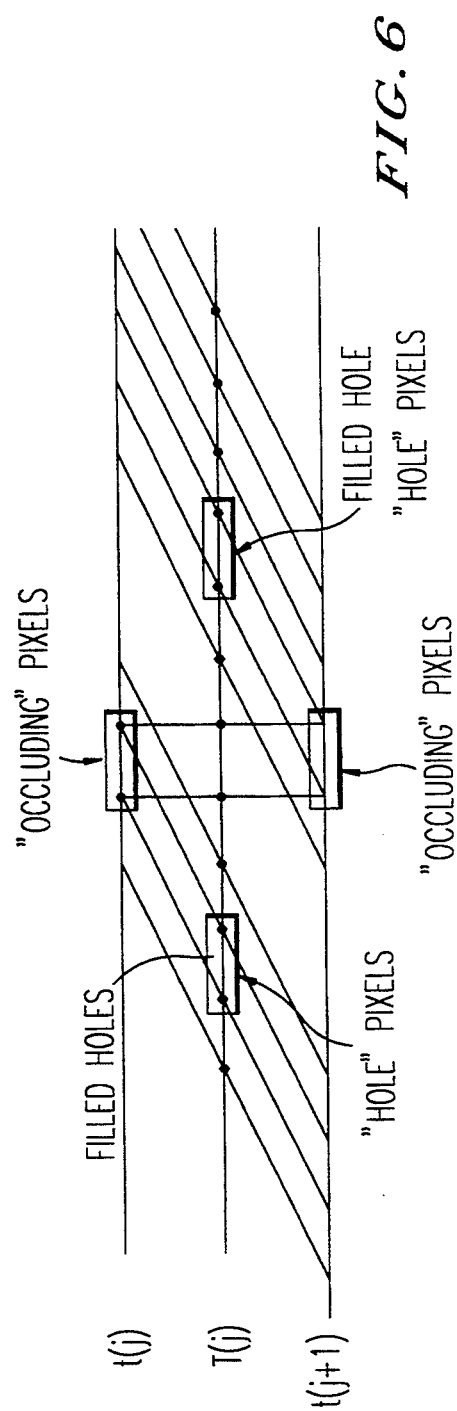
FIG. 6 is a diagram giving the field of motion of a the interpolate image, the interpolation being based on the "occluding" tag in the current images t(j) and t(j+1)

The application of the method, described above, of classifying the pixels of a current image to the temporal interpolation of an image T(j) will now be described more particularly with reference to FIG. 6. Image interpolation is used in image processing especially to produce a frequency change, for example transferring the 50 Hz frequency to the 60 Hz frequency or in high-definition television for transmitting maximum information.

Various methods of temporal interpolation have already been described, notably in French Patent Application No. 87 07814 and in French Patent Application No. 89 04256. The taking into account of the classification given above makes it possible to improve the methods described in these patent applications by making it possible correctly to estimate the motion vectors assigned to the "appearing" and "disappearing" zones and readily to determine the foreground zones crossing the background ones from one image to the next.

The case of interpolation with the taking into account of "appearing" and "disappearing" zones involves defining, for each pixel of the image to be interpolated T(j) situated between the current images t(j) and t(j+1), its motion vector and its tag, and in then interpolating therefrom the luminance by taking into account the said motion vector and the said tag.

With the image to be interpolated T(j) lying between two current images t(j) and t(j+1) for which a field of motion and a tag field have already been defined, as described above, the possible tags for the image to be interpolated T(j) are as follows:

"normal": the pixel is present in the two enclosing input images t(j) and t(j+1); it is therefore interpolated from the two ends of its motion vector in images t(j) and t(j+1), using for example the method described in French Patent Application No. 87 07814;

"appearing": the pixel is present only in the input image t(j+1), its luminance is then equal to the luminance of the end point of its motion vector in image t(j+1), it being possible to calculate the luminance of this point by bilinear interpolation according to the method described in the French Patent Application mentioned above:

"disappearing": the pixel is present only in the input image t(j), its luminance is then equal to the luminance of the end point of its motion vector in image t(j); the luminance of this point can be calculated by bilinear interpolation as mentioned above.

Concerning the definition of the field of motion of the image to be interpolated T(j), the main difficulties are in correctly estimating the vectors in the "appearing" and "disappearing" zones as well as in the foreground zones crossing the background ones from one image to the next as discussed above. To obtain a correct definition of the field of motion of the image to be interpolated T(j) it is therefore possible to exploit, in accordance with the present invention, the pixel classification carried out for the current image t(j+1) as discussed above.

Various methods of defining the field of motion and the tag field for the image to be interpolated T(j) can be used.

The first method consists in defining the field of motion of the image to be interpolated T(j) by temporal projection of the estimated field of motion for the current image t(j+1) and by using its tag field with three classes, namely "normal", "appearing" and "occluding". This method will be described in more detail with reference to FIG. 6. The classification of the pixels of the image to be interpolated T(j) is carried out in the course of the temporal projection of the field of motion of the current image t(j+1) onto the image to be interpolated T(j). Initially, all the points of the image to be interpolated T(j) are tagged "holes". Then, the motion vectors of the current image t(j+1) are projected one-after the other onto the image to be interpolated T(j) in a known manner. Next, the assigning of a tag and a motion vector for all the pixels of the image to be interpolated T(j) is carried out as follows:

if the pixel of the image to be interpolated T(j) is tagged "hole", and if the pixel of the current image t(j+1) is tagged "occluding" and if the value of $|DFD|$ <threshold, the tag of the pixel of T(j) becomes "occluding";

if the pixel of t(j+1) is tagged "normal" or "appearing" or "occluding" and if the value $|DFD|$ >threshold, then the tag of the pixel of T(j) becomes "normal";

if the tag of the pixel of T(j) is "normal", and if the tag of the pixel of t(j+1) is "occluding" and if the value $|DFD|$ <threshold, then the motion vector already attributed to the pixel of the image to be interpolated T(j) is replaced by the new vector which is "occluding" and the new tag for the pixel of T(j) becomes "occluding";

if the pixel of T(j+1) is tagged "normal", or "appearing" or "occluding" and if the value $|DFD|$ >threshold, then the two motion vectors are compared on the basis of the values of $|DFD|$ and the tagging is not modified, i.e. the tag of the pixel of T(j) remains "normal" but the motion vector with minimum $|DFD|$ is attributed to this pixel;

if the pixel of T(j) is tagged "occluding", and if the pixel of t(j+1) is tagged "occluding" and if its value $|DFD|$ >threshold, then the motion vectors are compared on the basis of the values of $|DFD|$ and the tagging is not modified, i.e. the tag of the pixel of T(j) remains "occluding" but the motion vector with minimum $|DFD|$ is attributed to this pixel;

if the pixel of t(j+1) is tagged "normal" or "appearing" or "occluding" and if the value $|DFD|$ >threshold, then the old motion vector is preserved and the tagging is not modified, i.e. the tag of the pixel of T(j) remains "occluding".

Thus, when a pixel of the image to be interpolated T(j) receives a vector of the current image t(j+1), their respective tags are firstly compared and then, as appropriate, the values of $|DFD|$ of the projected vector of the current image t(j+1) and of the pixel of the image to be interpolated T(j) receiving this vector are compared. Having carried out the projection, the tags of the pixels of the image to be interpolated T(j) belong to one of the three classes "normal", "occluding" and "hole". The pixels tagged "hole" possess no associated vectors. The distinction between "normal" and "occluding" has therefore made it possible to resolve the ambiguities due to the crossing of objects between two input images. This distinction therefore disappears later on. The method described above has therefore essentially been of use in defining the field of motion of the pixels of the image to be interpolated T(j), and which are assumed to be present in the current images t(j) and t(j+1). At this stage the "appearing" and "disappearing" tags still do not exist in the image to be interpolated T(j). These pixels are assumed to be present among those currently tagged "hole". An incomplete field of motion is therefore available over the image to be interpolated T(j). The holes in the field of motion of the image to be interpolated T(j) must therefore be filled. This filling can be performed by spatial interpolation, for example according to the method described in French Patent Application No. 88 12468. Having carried out this spatial interpolation, each pixel of the image to be interpolated T(j) possesses a motion vector passing through the pixel and the ends of which are located on the two current images t(j) and t(j+1).

Having carried out this filling, the classification of the pixels and an adaptive interpolation are performed by taking into account only the "non-occluding" ends of the motion vectors in the current images t(j) and t(j+1). This specific method is illustrated more particularly in FIG. 6. The field of motion of the image to be interpolated T(j) after filling the holes is middle filtered in accordance with the method described in French Patent Application No. 89 04256, for example. Thereby, the pixels of the image to be interpolated T(j) tagged "normal" or "occluding" will be interpolated from the two current images t(j) and t(j+1). As far as the pixels tagged "hole" in the image to be interpolated T(j) are concerned, the two ends of the motion vector are observed by examining the tag of each of the four pixels enclosing each of the said ends. If one at least of these pixels is tagged "occluding", the relevant end is termed "occluding" and is discarded unless the ends are in this situation, which cancels out their effect, the pixel tagged "hole" in the image to be interpolated T(j) being interpolated only from the "non-occluding" ends.

In this case the type of the pixel closest to the ends in the current images t(j+1) and t(j) are observed for each of the motion vectors:

if at the end located in image t(j+1) one of the four pixels enclosing the end of the vector is "occluding" and if in the region of the end located in image t(j) none of the four pixels enclosing the end of the vector is "occluding", then the motion vector of the pixel of the image to be interpolated T(j) is reconstructed from the current image t(j) only;

if in the region of the end located in image t(j) one of the four pixels enclosing the end of the motion vector is "occluding", and if in the region of the end located in image t(j+1) none of the four pixels enclosing the end of the motion vector is "occluding", then the motion vector of the image to be interpolated T(j) is reconstructed from t(j+1) only;

if at the two ends of the motion vector one of the four pixels enclosing the ends of the motion vectors arising from the image to be interpolated T(j) is "occluding", then reconstruction is carried out on the basis of the two images in a conventional manner, and if at the two ends of the vector none of the four enclosing pixels is "occluding", then reconstruction is again carried out on the basis of the two images.

In this case, the identification of the "appearing" and "disappearing" pixels is carried out at the time of the interpolation on the "hole" pixels. The "occluding" tagging of the images t(j) and t(j+1) is therefore relied upon in order to detect the "appearing" or "disappearing" pixels of the image to be interpolated T(j). This information is the most reliable since it has been filtered as described above. Moreover, it is possible also to carry out a temporal filtering since an "occluding" pixel generally remains so over several images.

Another method which can be used in this case consists in taking into account in addition to the "occluding" tagging the "appearing" tags in the current image t(j+1) and the "disappearing" tags in the current image t(j). In this case the following tag fields are available: in the current image t(j+1), the "normal", "occluding", "appearing" and "disappearing" tags, and in the image to be interpolated T(j), the "normal", "occluding" and "hole" tags.

As before, the pixels of the image to be interpolated T(j) tagged "normal", or "occluding" are interpolated in a known manner from the current images t(j) and t(j+1). When [sic] to the pixels tagged "hole", they are interpolated as follows:

if at the level of the current image t(j) one of the four pixels enclosing the end of the motion vector is "occluding" and none is "disappearing", and if at the level of the current image t(j+1) one of the four pixels enclosing the end of the motion vector is "appearing", then the pixel of the image to be interpolated T(j) is reconstructed from t(j+1) only;

if at the level of the image to be interpolated t(j+1) one of the four pixels enclosing the end of the motion vector is tagged "occluding" and none is "appearing" and at the level of the current image t(j) one of the four pixels enclosing the end of the motion vector is tagged "disappearing", then the pixel of the image to be interpolated T(j) is reconstructed from t(j) only;

in all other cases the pixel is reconstructed from the two ends in the current images t(j+1) and t(j).

All the various steps will now be described making it possible to carry out the interpolation of an image T(j) by temporal projection of the field of motion of t(j+1) onto the image to be interpolated T(j) by taking the pixel classification carried out on current image t(j+1) on the basis of the classification of the pixels of the current image t(j) whilst referring in particular to FIG. 4. As represented in this FIG. 4, we have the images t(j) and t(j+1) as input. The estimated field of motion over t(j), symbolized by the reference 10, and the tag field of t(j), symbolized by the reference 11, are known. By temporal projection onto t(j+1), as represented at 12, a predictive field of motion is obtained for image t(j+1) at 13, as is a tag field for t(j+1) at 14. The information obtained at 13 and at 14 is used to fill the holes in the image t(j+1) as represented by reference 15. Then, having carried out this filling, a predictive field of motion is obtained over the current image t(j+1) at 16, which is used to carry out an estimation of motion in association with information about the input image t(j), as represented by the reference 17. Having carried out this estimation of motion the estimated field of motion over t(j+1) is available at 18 and the elements contained at 18, at 16 and at 14 are used to carry out a modification of the tagging of the pixels of t(j+1) as referenced at 19 so as to obtain the tag field of t(j+1) at 20. This tag field of t(j+1), as well as the estimated field of motion of t(j+1) at 18, are used in association with the elements relating to the input image t(j) in order to carry out a temporal projection onto an image to be interpolated T(j), as represented by the reference 21. Having carried out this temporal projection, a field of motion is obtained for the image to be interpolated T(j), as is a tag field referenced 22 and 23 respectively. In the field of motion of the image to be interpolated T(j) the filling of the holes is carried out at 24 so as to obtain a new field of motion for the image to be interpolated T(j) at 25. This new field of motion arising from 25 as well as the tag field arising from 23, and then the tag field relating to the current image t(j+1) and arising from 20, and the tag field relating to the current image t(j) and arising from 11 are used to carry out an adaptive interpolation with motion compensation giving the image to be interpolated T(j) as referenced by 26 and 27.

Figure 7:
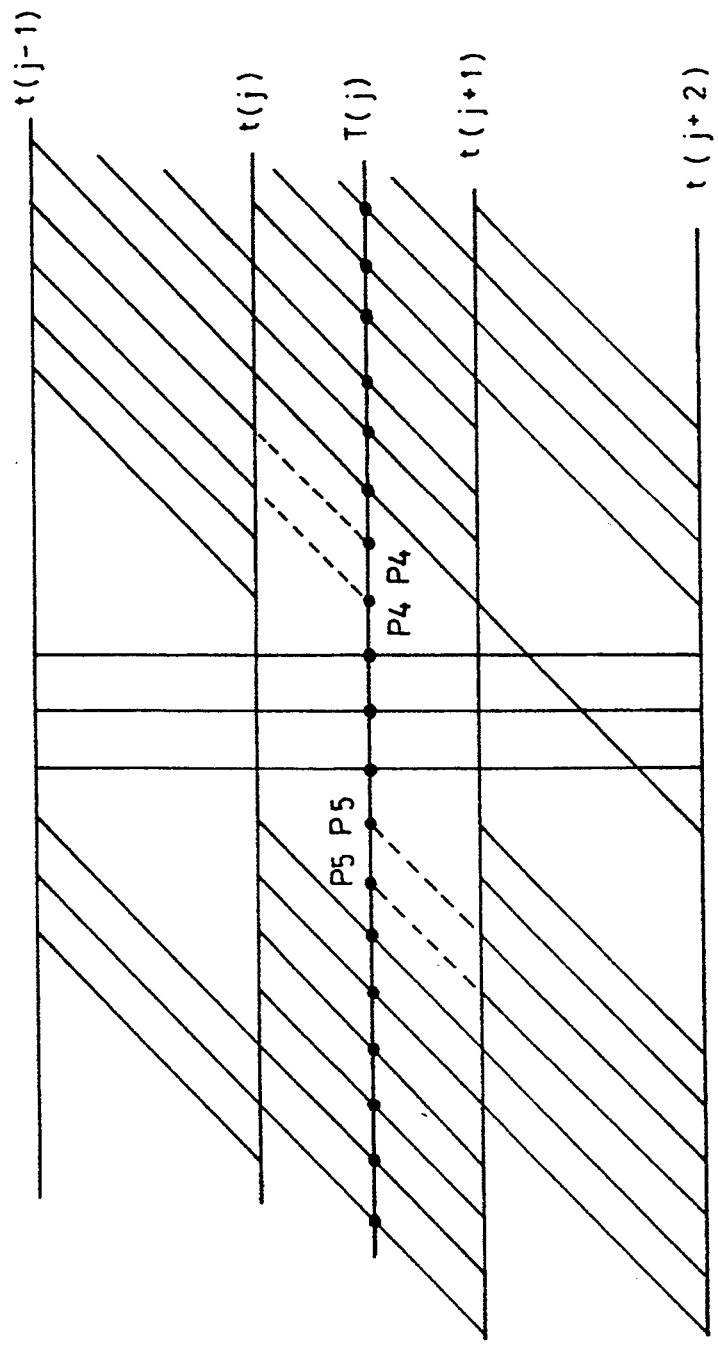
FIG. 7 is a diagram illustrating the method of interpolation of T(j) by projection of the fields of motion of t(j+1), t(j+2) and t(j).

Another method of interpolating an image T(j) by projecting the fields of motion of three current images t(j+1), t(j+2) and t(j) will now be described whilst referring more particularly to FIG. 7. In this case, the motion vectors of the pixels tagged "hole" of the image to be interpolated T(j) are defined by temporal projection of the motion vectors t(j) and t(j+2). The new class of the pixels tagged "hole" is deduced directly from this projection as represented clearly in FIG. 7. In this case the procedure is therefore as follows:

1. Projection of the field of motion of the current image t(j+1) onto the image to be interpolated T(j) according to the method described above relating to image projection but without projecting the motion vectors tagged "appearing";

2. Projection of the field of motion of the current image t(j) onto T(j) with the exception of the motion vectors tagged "appearing". This projection is intended for the pixels tagged "hole" only, as represented by the pixels P4 in FIG. 7. Accordingly, the motion vectors whose point of impact is the nearest to a pixel tagged "hole" are retained. When a "hole" pixel is thus filled its tag becomes "disappearing".

3. Projection of the field of motion of the current image t(j+2) onto the image to be interpolated T(j), with the exception of the motion vectors tagged "appearing". This projection is addressed to the pixels still tagged "hole" at the end of the preceding step. Accordingly, the motion vectors whose point of impact is the nearest to a pixel tagged "hole", such as pixel P5, are retained. When a pixel tagged "hole" is thus filled its tag becomes "appearing". A spatial interpolation of the motion vectors is next carried out for the pixels remaining without an associated motion vector and, in this case, the "hole" tag is replaced by "normal". Then an interpolation is carried out within the set of pixels whilst taking into account the associated tag as follows:

on the basis of two current images t(j) and t(j+1) if the pixel is tagged "normal";

on the basis of the current image t(j) only if the pixel is tagged "disappearing";

on the basis of the current image t(j+1) only if the pixel is tagged "appearing".

However, this method of interpolation requires a good field of motion owing to the temporal projection of distant fields of motion such as that of the current image t(j) and above all that of the current image t(j+2), since the errors amplify.

I claim:

1. Method for classifying the pixels of a current image t(j+1) obtained by temporal projection of the field of motion of a preceding image t(j) belonging to a sequence of moving images, the pixels of the preceding image being defined by a motion vector and by a tag, the tag belonging to a class defined from at least three classes termed "normal", "occluding" or "appearing", the said method comprising the steps of:

before projection, all the pixels of the current image t(j) are tagged "appearing";

carrying out temporal projection of t(j);

modify tagging during temporal projection by taking into account the tagging of the pixels of the image t(j) in such a way that:

if a pixel tagged "appearing" receives a motion vector, change its tag to "normal";

if a pixel is tagged "normal" receives a motion vector, change its tag to "occluding" and assign it the motion vector with minimum |DFD| (for displaced frame difference);

if a pixel tagged "occluding" receives a motion vector, leave its tag as occluding and assign it the motion vector with minimum |DFD| and;

if a pixel tagged "appearing" receives no motion vector, leave the tag as "appearing".

2. Method according to claim 1, wherein, if during the temporal projection of the field of motion of the preceding image t(j) onto the current image t(j+1), the motion vector projected onto the current image t(j+1) of a pixel of the preceding image t(j) conflicts with another vector and is not retained, then the pixel of the image t(j) is tagged "disappearing".

3. Method of modifying the tags assigned to the pixels of the image t(j+1), each pixel being defined by a motion vector and a tag which are obtained using the method according to claim 1, in such a way that, for the image t(j+1), a temporal motion prediction field is available, wherein, in a first step, the motion is estimated for all the vectors of the image t(j+1) so as to obtain an estimated field of motion, then for each pixel the motion prediction field is compared with the estimated field of motion in such a way as possibly to modify the tags assigned to the pixels of the image t(j+1) according to the following procedure:

if the tag is "normal" it remains "normal";
if the tag is "appearing" it remains "appearing";
if the tag is "filled-in" it is changed to "normal";
if the tag is "occluding", for each of the horizontal and vertical components of the predicted motion vector and of the estimated motion vector, their difference is calculated and if one of the differences is greater than a threshold the tag becomes "normal", otherwise it remains "occluded".

4. Method according to claim 3, wherein the "occluding" tag is affirmed only when the pixel following in the sequence of images has been labelled "occluding" at least N times with N>1.

5. Method according to claim 1, wherein, during temporal projection, the tags assigned to the pixels of the image t(j) are examined and if the pixel of the image t(j) is tagged "appearing" its motion vector is not assigned to the pixels of the current image t(j+1).

6. Method according to claim 1, wherein, during temporal projection, the tags assigned to the pixels of the image t(j) are examined and the pixels of the current image t(j+1) are tagged according to the table below in which the pixels of the image t(j+1) are assigned a tag chosen from the classes "appearing", "normal", "occluding" and "filled in":

| t(j + 1) tag + vector | t(j) tag + vector | Appearing D1 | Normal or occluding D1 |
|---|---|---|---|
| Appearing | | Filled in D1 | Normal D1 |
| Normal D2 | | Normal D2 | Occluding min(\|DFD(D1)\|, \|DFD(D2)\|) |
| Occluding D2 | | Occluding D2 | Occluding min(\|DFD(D1)\|, \|DFD(D2)\|) |
| Filled in D2 | | Filled in min(\|DFD(D1)\| \|DFD(D2)\|) | Normal D1 |

7. Method according to either one of claims 5 or 6, wherein the motion vector of a pixel of the current image t(j+1) assigned an "appearing" tag is obtained by spatial interpolation of the motion vectors of its neighbourhood.

8. Method according to claim 7, wherein the motion vector of a pixel of the current image t(j+1) assigned an "appearing" tag is obtained by taking a mean of the motion vectors of the pixels which form part of its spatial neighbourhood without taking account of the pixels tagged "appearing".

9. Method of temporal interpolation of images with motion compensation, including in particular a phase of estimating the field of motion of the field of tags of an image to be interpolated T(j) from at least two known images t(j), t(j+1) enclosing it, the characteristics of each pixel of the image T(j) being determined from the characteristics of the associated pixels of the images t(j), t(j+1) each defined by a motion vector and by a tag, in which the field of motion of the image to be interpolated T(j) is defined by temporal projection of the estimated field of motion at the known image t(j+1) by using the methods according to claim 1, wherein before projection, all the pixels of the image to be interpolated T(j) are tagged "holes";

then, in the course of the temporal projection, the tags and the motion vectors assigned to the pixels of the image t(j+1) are examined and a tag and a motion vector are given to the pixels of the image to be interpolated T(j) according to the table below:

| T(j) tag + vector | t(j + 1) tag + vector | Normal or appearing or occluding and \|DFD\| > S (S = threshold) D1 | Occluding and \|DFD\| < S D1 |
|---|---|---|---|
| Hole | | Normal D1 | Occluding D1 |
| Normal D2 | | Normal min(\|DFD(D1)\|, | Occluding D1 |

-continued

| Occluding D2 | \|DFD(D2)\|) Occluding D2 | Occluding min(\|DFD(D1)\|, \|DFD(D2)\|) |
|---|---|---|

10. Method according to claim 9, wherein, having carried out the temporal projection of the field of motion of the image t(j+1), the pixels of the image to be interpolated T(j) tagged "holes" receive a motion vector obtained in a known manner by spatial interpolation.

11. Method according to claims 9 or 10, wherein the pixels of the image T(j) tagged "normal" or "occluding" are interpolated from the two images enclosing it t(j) and t(j+1), whereas the pixels of the image T(j) tagged "holes" are interpolated by examining the tag of each of the four pixels enclosing the two ends of the motion vector in the images t(j) and t(j+1), in such a way that:

if, in image t(j+1), at least one of the four pixels enclosing the end of the motion vector is tagged "occluding" and if, in the image t(j) none of the four pixels enclosing the end of the motion vector is tagged "occluding", the luminance of the pixel of the image T(j) is constructed from the image t(j) alone;

if in the image t(j), at least one of the four pixels enclosing the end of the motion vector is tagged "occluding" and if in the image t(j+1) none of the four pixels enclosing the end of the motion vector is tagged "occluding" the luminance of the pixel of the image T(j) is reconstructed from the image t(j+1) alone;

if, at the two ends of the motion vector, at least one of the four pixels is tagged "occluding" or no pixel is tagged "occluding", the luminance of the pixel of the image T(j) is reconstructed from both images.

12. Method according to claims 9 or 10, characterised in that the pixels of the image T(j) tagged "normal" or "occluding" are interpolated from the two images enclosing it t(j) and t(j+1) whereas the pixels of the image T(j) tagged "holes" are interpolated by examining the tag of each of the four pixels enclosing the two ends of the motion vector on the images t(j) and t(j+1), in such a way that:

if, in the image t(j), one of the four pixels enclosing the end of the motion vector is tagged "occluding" and none is "disappearing", and if in the image t(j+1) one of the four pixels enclosing the end of the motion vector is tagged "appearing", the luminance of the pixel of the image T(j) is reconstructed from the image t(j+1) alone;

if, in the image t(j+1), one of the four pixels enclosing the end of the motion vector is tagged "occluding" and none is "appearing" and if in the image t(j) one of the four pixels enclosing the end of the motion vector tagged "disappearing", the luminance of the pixel of the image T(j) is reconstructed from the image t(j) alone;

in the other cases, the luminance of the pixel of the image T(j) is reconstructed from the images t(j+1) and t(j).

13. Method of temporal interpolation according to claim 9, wherein:

when projecting the field of motion of the known image t(j+1) onto the image to be interpolated T(j), the motion vector of the pixels of the image t(j+1) tagged "appearing" is not projected;

next, the field of motion of the image t(j) is projected onto the image to be interpolated T(j) by using the same method as for the projection of the image t(j+1), a "hole" pixel filled by a motion vector being tagged "disappearing";

then, the field of motion of an image t(j+2) following an image t(j+1) is projected onto the image to be interpolated T(j) by using the same method as for the projection of the image t(j+1) but tagging a hole pixel filled by an "appearing" motion vector in such a way as to take into account the "appearing" and "disappearing" pixels.

14. Method according to claim 13, wherein the motion vector of a pixel of the image to be interpolated T(j) assigned a "hole" tag is calculated by spatial interpolation and the pixel is assigned a "normal" tag.

15. Method according to either one of claims 13 or 14, wherein:

the pixels of the image T(j) tagged "normal" are interpolated from the two images enclosing it t(j) and t(j+1);

the pixels of the image T(j) tagged "disappearing" are interpolated from the image t(j), and the pixels of the image T(j) tagged "appearing" are interpolated from the image t(j+1).

* * * * *